United States Patent
Ahn et al.

(10) Patent No.: US 7,965,836 B2
(45) Date of Patent: Jun. 21, 2011

(54) DATA CIPHER PROCESSORS

(75) Inventors: Kyoung-moon Ahn, Seoul (KR); Mi-jung Noh, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1609 days.

(21) Appl. No.: 11/063,912

(22) Filed: Feb. 23, 2005

(65) Prior Publication Data

US 2005/0207571 A1    Sep. 22, 2005

(30) Foreign Application Priority Data

Mar. 16, 2004    (KR) ........................ 10-2004-0017671

(51) Int. Cl.
   *H04L 9/00*    (2006.01)
(52) U.S. Cl. .............................. 380/28; 380/37; 380/277
(58) Field of Classification Search .................... 380/28, 380/37, 277
   See application file for complete search history.

(56) References Cited

U.S. PATENT DOCUMENTS

| | | | | |
|---|---|---|---|---|
| 6,542,553 | B1 * | 4/2003 | Le Dantec et al. | 375/261 |
| 6,574,772 | B1 * | 6/2003 | Chou | 714/784 |
| 6,611,512 | B1 * | 8/2003 | Burns | 370/342 |
| 6,940,975 | B1 * | 9/2005 | Kawamura et al. | 380/37 |
| 7,158,638 | B2 * | 1/2007 | Okada et al. | 380/37 |
| 7,257,229 | B1 * | 8/2007 | Leshem | 380/277 |
| 7,295,671 | B2 * | 11/2007 | Snell | 380/28 |
| 2002/0012430 | A1 * | 1/2002 | Lim | 380/29 |
| 2002/0191784 | A1 * | 12/2002 | Yup et al. | 380/37 |
| 2003/0055858 | A1 | 3/2003 | Dubey et al. | |
| 2003/0093450 | A1 | 5/2003 | Chen | |
| 2003/0099352 | A1 | 5/2003 | Lu et al. | 380/37 |
| 2003/0108195 | A1 | 6/2003 | Okada et al. | 380/37 |
| 2003/0133568 | A1 * | 7/2003 | Stein et al. | 380/37 |
| 2004/0078409 | A1 * | 4/2004 | Stein et al. | 708/492 |
| 2005/0283714 | A1 * | 12/2005 | Korkishko et al. | 714/781 |
| 2006/0120527 | A1 * | 6/2006 | Baek | 380/252 |
| 2006/0198524 | A1 * | 9/2006 | Sexton | 380/277 |

FOREIGN PATENT DOCUMENTS

| | | |
|---|---|---|
| EP | 1 267 514 A2 | 12/2002 |
| EP | 1 557 740 A2 | 7/2005 |
| JP | 2002-366029 | 12/2002 |
| JP | 2003015522 | 1/2003 |
| KR | 1020030051111 | 6/2003 |
| WO | WO 03/019357 A1 | 3/2003 |

(Continued)

OTHER PUBLICATIONS

Elena Trichina; "Logic Design for AES SubByte Transformation on Masked Data"; Cryptology ePrint Archive, 2003/236, (2003); "http://eprint.iacr.org/2003/236.pdf"; pp. 1-13.*

(Continued)

*Primary Examiner* — Carl Colin
(74) *Attorney, Agent, or Firm* — Myers Bigel Sibley & Sajovec

(57) ABSTRACT

Data cipher processors, advanced encryption standard (AES) cipher system, and AES cipher methods using a masking method perform round operations using a round key, a plain text, a cipher text, and masking data. Some of the round operations are implemented over a composite Galois Field GF(•). Original data and predetermined masking data are processed according to a predetermined rule. Sub-byte transformation operations used in the cipher method and system may include an affine transformation, an inverse affine transformation, an isomorphic transformation, and an inverse isomorphic transformation which are linear transformations, and an inverse transformation that is a non-linear transformation.

1 Claim, 7 Drawing Sheets

FOREIGN PATENT DOCUMENTS

| WO | WO 03/101020 A1 | 12/2003 |
|----|----|----|
| WO | WO 2004/014016 A1 | 2/2004 |

OTHER PUBLICATIONS

Christof Paar, Peter Fleischmann, Peter Roelse; "Efficient multiplier architectures for galois fields GF(2 4n)"; IEEE, 1998; 22 Pages.*

Trichina et al; "Supplemental Cryptographic Hardware for Smart Cards"; IEEE Nov.-Dec. 2001; pp. 26-35.*

Satoh et al "A Compact Rijndael Hardware Architecture with S-Box Optimization" ASIACRYPT 2001, LNCS 2248; 2001 pp. 239-254.*

Jovan Dj. Golic and Christophe Tymen; "Multiplicative Masking and Power Analysis of AES"; Oct. 30-31, 2001; pp. 1-14.*

Daemen et al., "Rijndael: beyond the AES", Mikulasska kryptobesidka, 2002, 1 page.

Golic et al., "Multiplicative Masking and Power Analysis of AES", *Cryptographic Hardware and Embedded Systems—CHES 2002*, vol. 2523 of *Lecture Notes in Computer Science*, pp. 198-212, Springer-Verlag, 2003.

Notice to Submit a Response for Korean Patent Application No. 10-2004-0017671 mailed on Feb. 27, 2006.

Daemen et al. "AES Proposal: Rijndael" 45pages (1999).

Daemen et al., "Rijndael: beyond the AES", Mikulasska kryptobesidka, pp. 1-10 (2002).

Baek et al. "DPA-Resistant Finite Field Multipliers and Secure AES Design", LNCS, Information Security Practice and Experience, 2006, vol. 3903, p. 1-12.

Chang et al. "Securing AES against Second-Order DPA by Simple Fixed-Value Masking", vol. 2003, No. 15, p. 145-150.

First Office Action dated Dec. 21, 2010 corresponding to Japanese Patent Application No. 2005-075869, 4 pages.

Golic et al. "Universal masking on logic gate level", *Electronics Letters*, [online] Apr. 29, 2004; vol. 40, Issue 9, p. 526-528, URL, http://ieeexplore.ieee.org/stamp/stamp.jsp?tp=&arnumber=1296970.

Ogino et al., (DES) AES (Rijndael) (2), Jul. 2001, p. 56-60.

Oswald et al. SCA-Lab Technical Report Series: "Secure and Efficient Masking of AES—A Mission Impossible?", Cryptology e Print Archive: Report 2004/134, [online], Version: 20040604:121931, p. 1-18, URL, http://eprint.iacr.org/2004/134.pdf.

Trichina, Elena Cominational Logic Design for AES Subbyte Transformation on Masked Data, Cryptology ePrint Archive: Report 2003/236, [online], Version 20031112: 135420, pp. 1-13, URL, http://eprint.iacr.org/2003/236.pdf.

* cited by examiner

DATA CIPHER PROCESSORS

CROSS-REFERENCE TO RELATED APPLICATION

This application claims the priority of Korean Patent Application No. 2004-0017671, filed on Mar. 16, 2004, the disclosure of which is hereby incorporated herein by reference in its entirety.

BACKGROUND OF THE INVENTION

The present invention relates to cipher systems and, more particularly, to advanced encryption standard (AES) hardware devices.

With advances in information technology, increasing attention has been directed to protection of information, which has, in turn, increased the importance of ciphers. In addition, with advances in technology, the lengths of cipher keys are getting longer as one approach to increasing security of high-level security processing systems. However, as processing systems become smaller and lighter, the ability to lengthen cipher keys is generally limited by the memory capacity and/or processing capabilities of the systems.

A data encryption standard (DES) had been used as a general cipher standard and, for security reasons, an advanced encryption standard (AES) has subsequently been adopted as a new block cipher algorithm standard. As such, it is expected that the DES used in many applications will be replaced by the AES. Also, in some applications, it may be desirable to implement the AES in hardware as well as in software. Where the AES is implemented in hardware, adequate hardware should be provided for protecting the AES from various attacks.

One of the methods used to attack a cipher system is a power analysis attack in which an attacker finds out cipher information about the cipher system by analyzing power characteristics of the cipher system when the cipher system operates. A power analysis attack generally presumes a plurality of bits included in plain data, i.e., unencrypted data, is distributed between two values logic high ("1") and logic low ("0"). A power curve of this information is analyzed to find out data before encryption.

There are a variety of ways to defend against a power analysis attack. One of them is a masking method. In the masking method, original data is generally not processed alone. Instead, the original data may be combined with a predetermined number and then processed. For example, a cipher system using the masking method may combine original data with random data before performing an encryption or decryption operation. After the encryption or decryption operation, the random data is separated from processed data, thereby producing a cipher text or a plain text.

When the masking method is used, it is generally difficult to guess or estimate the original data as a combination of the original data and random data are processed during encryption or decryption operations.

To provide a potentially highly efficient system secure against a power analysis attack, random data may thus be used for encryption or decryption operations. In addition, the encryption or decryption of the random data may be performed repeatedly using a round method, and a value of the random data may be updated every round. Conventional countermeasures against various attacks are discussed in the papers "An Implementation of DES and AES, Secure against Some Attacks," CHES '01 by M. Akkar, C. Giraud and "Simplified Adaptive Multiplicative Masking for AES," CHES '02 by E. Trichina, D. De Seta, and L. Germani.

FIG. 1A is a block diagram of a cipher system module not using a masking method. FIG. 1B is a block diagram of a cipher system module using a masking method. Note that, as used herein, $\oplus$ denotes an XOR gate.

Referring now to FIG. 1A, the module 110, which performs a predetermined processing operation without using a masking method, receives original data "a," processes the original data "a" according to a function (f) provided by an operation block 111 included in the module 110, and generates an output f(a), which is a function of the original data "a." As described above, as the module 110 does not use a masking method, it may be possible to guess/estimate/predict the original data "a" by analyzing a power curve of the operation block 111.

As shown in FIG. 1B, a module 120, using a masking method, processes data as defined by the following equations:

$$a' = a \oplus r \quad (1)$$

$$f(a') = f(a \oplus r) = b' \quad (2)$$

$$f(r) = s, \quad (3)$$

where "a" and "r" indicate original data and random data, respectively, and r is generated by a random data generator (not shown).

In the case of a linear function, $f(a \oplus r) = f(a) \oplus f(r)$. Therefore, a final value output from an XOR 124 performing an XOR operation may be expressed as:

$$\begin{aligned} b' \oplus s &= f(a') \oplus f(r) \\ &= f(a \oplus r) \oplus f(r) \\ &= f(a) \oplus f(r) \oplus f(r) \\ &= f(a) \end{aligned} \quad (4)$$

For the case of a linear function, $f(a \oplus r) = f(a) \oplus f(r)$. Therefore, $b' \oplus s = f(a)$ as illustrated in Equation 4.

Both the module 110 of FIG. 1A and the module 120 of FIG. 1B produce the same result value f(a), but may have a quite different effectiveness against power analysis attacks. When the masking method is not used, as illustrated in FIG. 1A, attackers may be able to easily extract the original data a through power analysis attacks. However, when the making method is used, as illustrated in FIG. 1B, it may be difficult or practically impossible to extract the original data "a" as a power curve analyzed by the attackers is not solely related to the original data "a."

However, when f is a non-linear function, $f(a \oplus r) \neq f(a) \oplus f(r)$. As a result, a different method is generally needed to satisfy Equation 4.

SUMMARY OF THE INVENTION

Embodiments of the present invention provide data cipher processors using a masking method in which original and random data are processed according to a predetermined rule for encryption or decryption, the data cipher processor being configured to receive a round key, a plain text, and masking data, and to perform at least a portion of a round operation over a Galois Field GF(•). An element over a $GF(2^8)$ domain is transformed into an element over a $GF(((2^2)^2)^2)$ domain, an element over the $GF(((2^2)^2)^2)$ domain is transformed into an element over a $GF((2^2)^2)$ domain, and an element over the $GF((2^2)^2)$ domain is transformed into an element over a $GF(2^2)$ domain.

In other embodiments of the present invention data cipher processors use a masking method to protect against a power analysis attack and may reduce the size of hardware required for implementing the masking method. In addition, advanced encryption standard (AES) cipher systems using a masking method to protect against a power analysis attack are also provided including data cipher processors. Methods are also provided.

In further embodiments of the present invention, data cipher processors using a masking method operate in response to a predetermined control signal; perform a round operation using a round key, a plain text, and masking data, and output a cipher text in the case of encryption, and perform the round operation using the round key, the cipher text, and the masking data, and output plain text in the case of decryption. At least part of the round operation is implemented over a composite Galois field $GF(\bullet)$.

In yet other embodiments of the present invention, AES cipher systems include a key scheduler that operates in response to a first control signal, receives key data, generates a round key, and generates a processing result signal in response to the first control signal. A data cipher processor operates in response to a second control signal, receives the round key, a plain text, and masking data, and performs a round operation for encryption, and receives the round key, a cipher text, and the masking data, and performs the round operation for decryption, and generates an operation result signal in response to the second control signal. A controller controls operation of the key scheduler using the first control signal transmitted to the key scheduler and the processing result signal received from the key scheduler, controls the data cipher processor using the second control signal transmitted to the data cipher processor and the operation result signal received from the data cipher processor, and outputs the cipher text in the case of encryption and the plain text in the case of decryption in response to the operation result signal.

In further embodiments of the present invention, AES cipher methods include performing an add round key transformation; a sub-byte transformation; a shift row transformation; and a mix column transformation. The sub-byte transformation includes a linear affine transformation, inverse affine transformation, isomorphic transformation, inverse isomorphic transformation, and a non-linear inverse transformation. The isomorphic transformation, the inverse isomorphic transformation, and the inverse transformation are implemented over a Galois Field $GF(\bullet)$ domain, and an element over a $GF(2^8)$ domain is transformed into an element over a $GF(((2^2)^2)^2)$ domain, an element over the $GF(((2^2)^2)^2)$ domain is transformed into an element over a $GF((2^2)^2)$ domain, and an element over the $GF((2^2)^2)$ is transformed into an element over a $GF(2^2)$ domain.

BRIEF DESCRIPTION OF THE DRAWINGS

The present invention will now be described with reference exemplary embodiments illustrated in the attached drawings in which.

DETAILED DESCRIPTION OF THE INVENTION

Figure 1A:
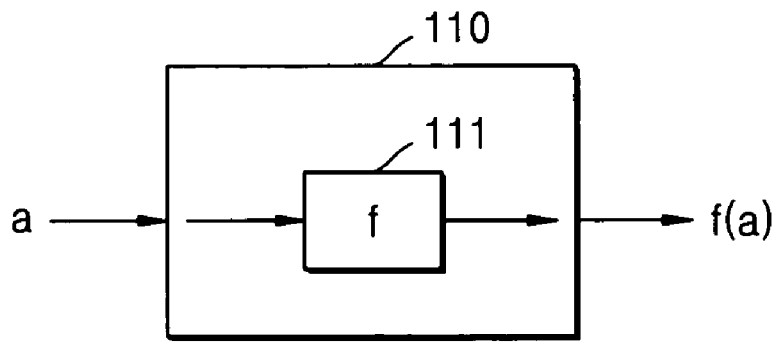
FIG. 1A is a block diagram illustrating a cipher system module not using a masking method.
Figure 1B:
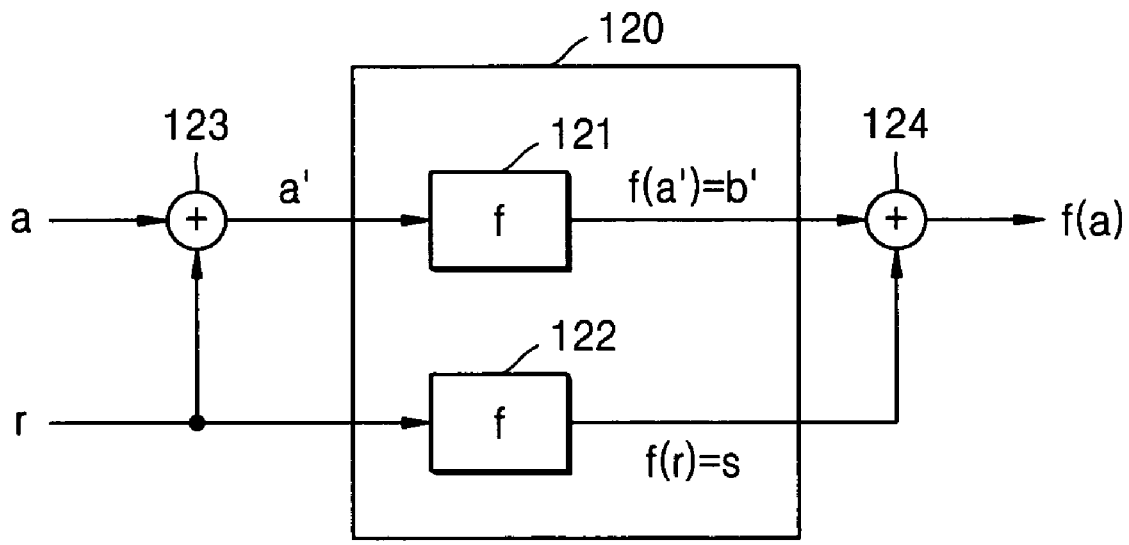
FIG. 1B is a block diagram illustrating a cipher system module using a masking method.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
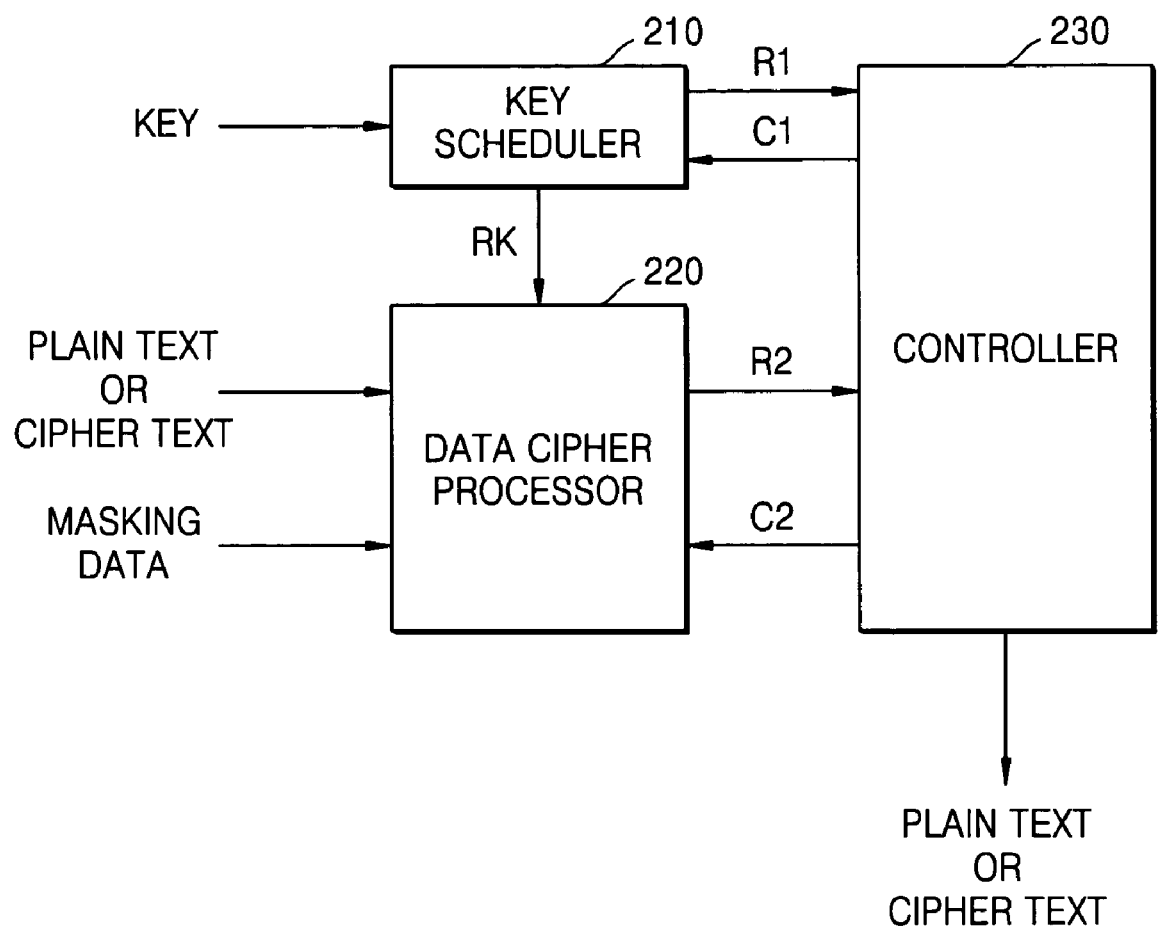
FIG. 2 is a block diagram illustrating an advanced encryption standard (AES) cipher system using a masking method according to some embodiments of the present invention.

Embodiments of the present invention will now be described with reference to FIGS. 2-9. FIG. 2 is a block diagram illustrating an advanced encryption standard (AES) cipher system using a masking method according to some embodiments of the present invention. As shown in FIG. 2, the AES cipher system includes a key scheduler 210, a data cipher processor 220, and a controller 230. The key scheduler 210 operates in response to a first control signal C1, generates a round key RK using received key data, and transmits a processing result signal R1 to the controller 230.

The data cipher processor 220 operates in response to a second control signal C2. For encryption, the data cipher processor 220 receives the round key RK, a plain text, and masking data, and performs a round operation. For decryption, the data cipher processor 220 receives the round key RK, a cipher text, and masking data, and performs the round operation. Then, the data cipher processor 220 transmits an operation result signal R2 to the controller 230.

The controller 230 generates the first control signal C1 controlling the key scheduler 210 and the second control signal C2 controlling the data cipher processor 220, and outputs a cipher text in the case of encryption, and a plain text in the case of decryption, using the operation result signal R2 received from the data cipher processor 220.

Figure 3:
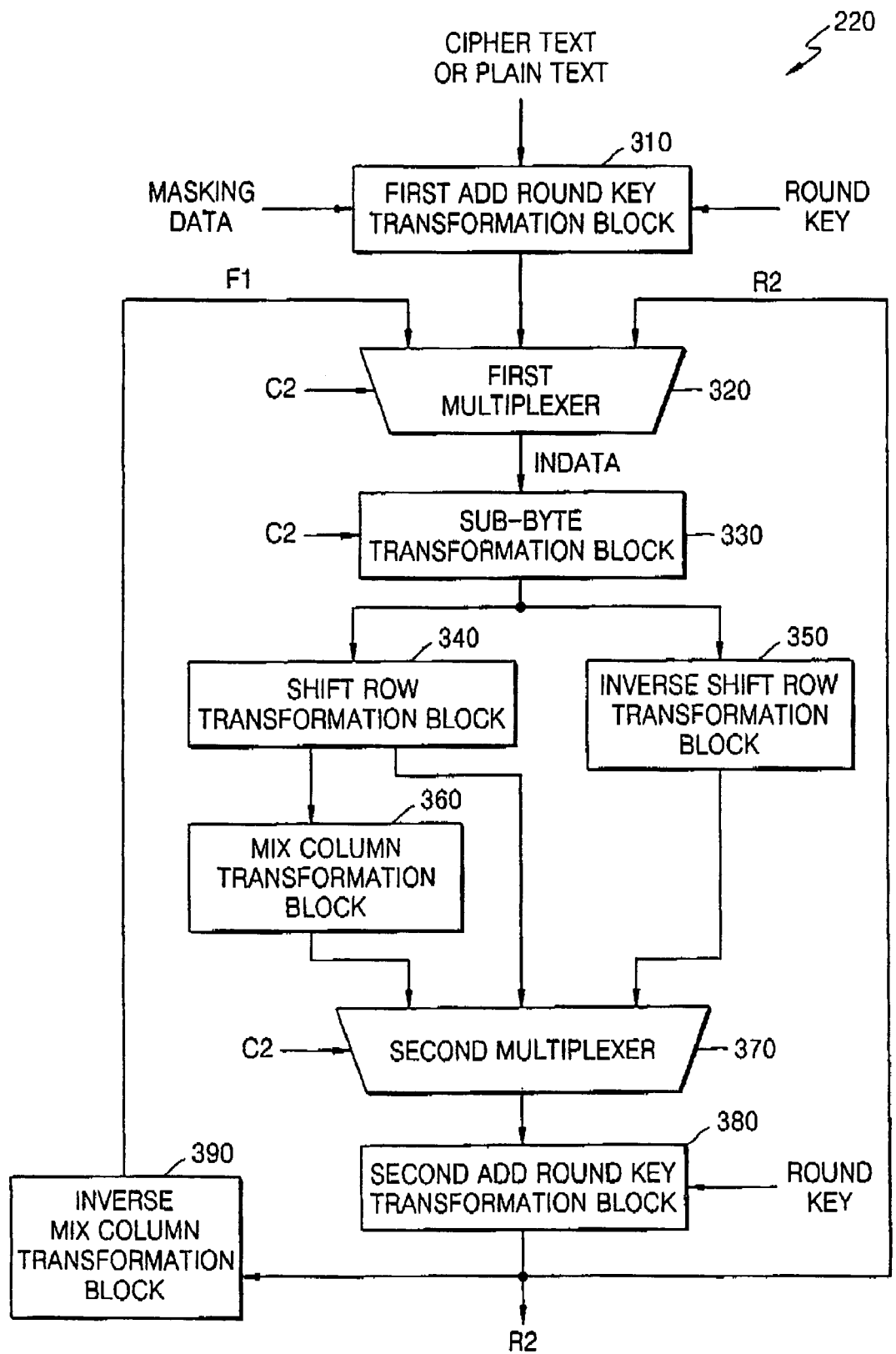
FIG. 3 is a block diagram illustrating the data cipher processor of FIG. 2 according to some embodiments of the present invention.

FIG. 3 is a block diagram illustrating the data cipher processor 220 of FIG. 2 according to some embodiments of the present invention. As shown in the embodiments of FIG. 3, the data cipher processor 220 includes a first add round key transformation block 310, a first multiplexer 320, a sub-byte transformation block 330, a shift row transformation block 340, an inverse shift row transformation block 350, a mix column transformation block 360, a second multiplexer 370, a second add round key transformation block 380, and an inverse mix column transformation block 390.

For encryption, the first add round key transformation block 310 receives the plain text, the masking data, and the round key RK, and performs an add round key transformation operation. For decryption, the first add round key transformation block 310 receives the cipher text, the masking data, and the round key RK, and performs the add round key transformation operation.

The first multiplexer 320 outputs a selected one of data output from the first add round key transformation block 310, the operation result R2, and a feedback signal F1 in response to the second control signal C2. The sub-byte transformation block 330 includes a plurality of S-BOXes (see FIG. 4), each performing a sub-byte transformation operation on data INDATA output from the first multiplexer 320 in response to the second control signal C2.

For an encryption operation, the shift row transformation block 340 performs a shift row transformation operation on data output from the sub-byte transformation block 330. In a decryption operation, the inverse shift transformation block 350 performs an inverse shift row transformation operation on the data output from the sub-byte transformation block 330. The mix column transformation block 360 performs a mix column transformation operation on data output from the shift row transformation block 340. The second multiplexer 370 outputs a selected one of data output from the mix column transformation block 360, the data output from the shift row transformation block 340, and data output from the inverse shift row transformation block 350 in response to the second control signal C2.

The second add round key transformation block 380 performs the add round key transformation operation on the round key RK and data output from the second multiplexer 370, and generates the operation result R2. The inverse mix column transformation block 390 performs an inverse mix column transformation operation on the operation result R2 and outputs the feedback signal F1.

The functional blocks illustrated in the embodiments of FIG. 3 are configured to perform respective predetermined operations. It will be understood that the description of the configuration of these blocks substantially corresponds to associated operations in method aspects of some embodiments of the present invention. Accordingly, the detailed description of various functional blocks hereinafter will be understood to also be applicable to the corresponding method operations.

Figure 4:
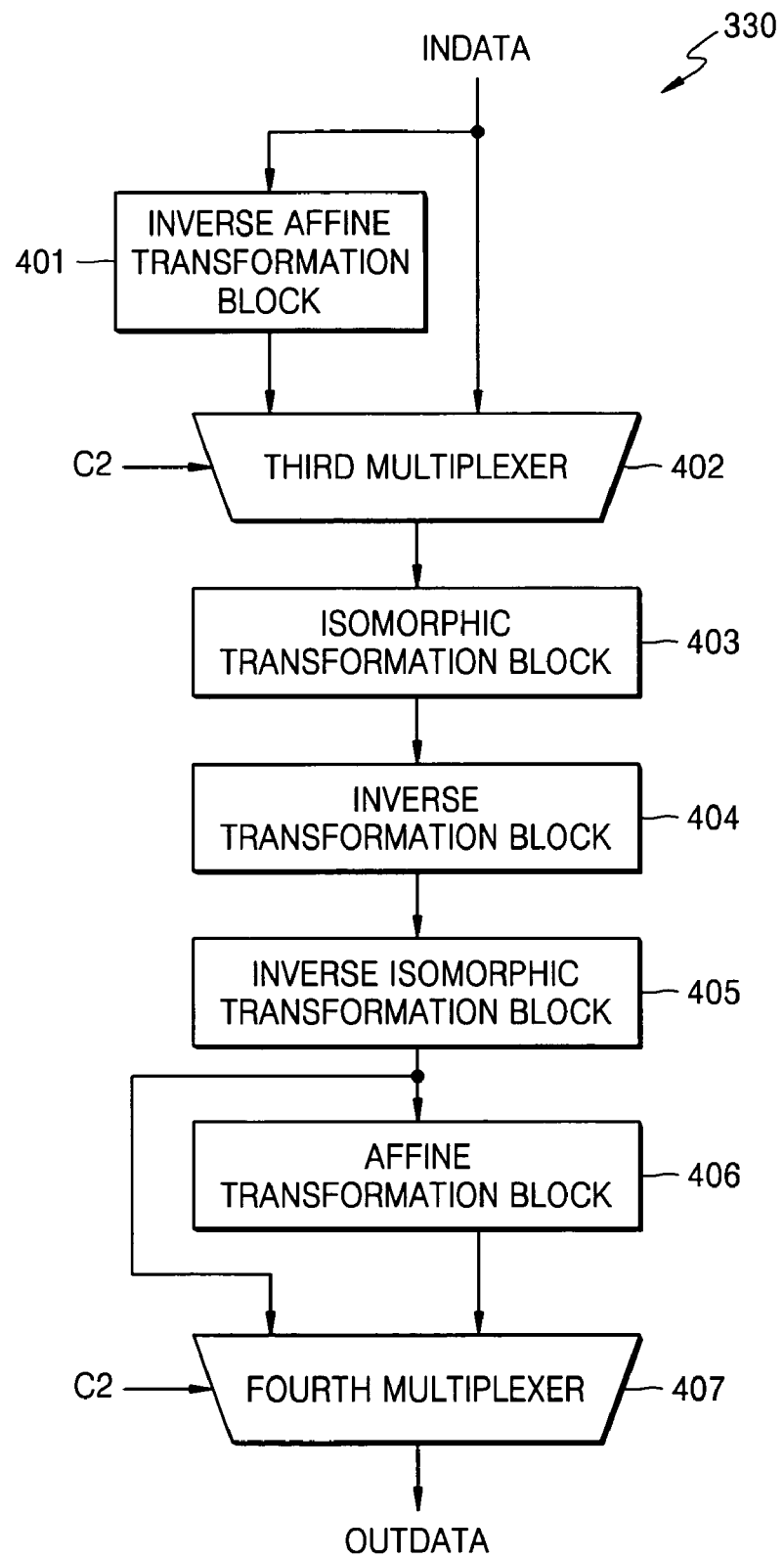
FIG. 4 is a block diagram illustrating an S-BOX included in the sub-byte transformation block of FIG. 3 according to some embodiments of the present invention.

FIG. 4 is a block diagram illustrating an S-BOX included in the sub-byte transformation block 330 illustrated in FIG. 3 according to some embodiments of the present invention. As shown in FIG. 4, the S-BOX includes an inverse affine transformation block 401, a third multiplexer 402, an isomorphic transformation block 403, an inverse transformation block 404, an inverse isomorphic transformation block 405, an affine transformation block 406, and a fourth multiplexer 407.

For a decryption operation, the inverse affine transformation block 401 performs an inverse affine transformation operation on the data INDATA received from the first multiplexer 320. The third multiplexer 402 outputs a selected one of data output from the inverse affine transformation block 401 and the data INDATA output from the first multiplexer 320 in response to the second control signal C2.

The isomorphic transformation block 403 performs an isomorphic operation on data output from the third multiplexer 402. The inverse transformation block 404 performs an inverse transformation operation on data output from the isomorphic transformation block 403. The inverse isomorphic transformation block 405 performs an inverse isomorphic transformation operation on data output from the inverse transformation block 404. For an encryption operation, the affine transformation block 406 performs an affine transformation operation on data output from the inverse isomorphic transformation block 405. The fourth multiplexer 407 outputs a selected one of data output from the affine transformation block 406 and the data output from the inverse isomorphic transformation block 405 in response to the second control signal C2.

The transformation operations performed by the inverse affine transformation block 401, the affine transformation block 406, the isomorphic transformation block 403, and the inverse isomorphic transformation block 405 are, in some embodiments of the present invention, linear transformations. When a linear function operation is implemented in hardware, a hardware module used when not applying the masking method may also be used when applying the masking method. The used size of the hardware module may be larger when the masking method is used as contrasted with when the masking method is not used, however, the hardware need not be more complicated.

However, a transformation performed by the inverse transformation block 404 may be a non-linear transformation. In this instance, the hardware module used when the masking method is not used may not be able to be used to implement the inverse transformation block 404 in hardware. In other words because, in the case of the non-linear function, original data cannot be easily recovered from data operated using the masking method, a common hardware module may not be effective. Therefore, it may be desirable to process original data together with random data while not revealing the original data during processing and while extracting the original data at the end of the processing operation.

In round operations not including a final round of an AES cipher system using the masking method, the sub-byte transformation block 330, the shift row transformation block 340, the mix column transformation block 360, the first add round key transformation block 310, and the second add round key transformation block 380 perform operations. In some embodiments of the present invention, the three transformation blocks 330, 340, 360 (not including the first and second add round key transformation blocks 310 and 380) use the masking method.

For some embodiments of the present invention, operations performed by the shift row transformation block 340 and the mix column transformation block 360 are based on linear operations. Therefore, a special circuit may not be required to implement the masking method in hardware. However, in some embodiments of the present invention, operations performed by the sub-byte transformation block 330 are based on a non-linear function and various embodiments of the present invention provide new hardware configurations for implementing the sub-byte transformation block 330 in hardware.

An AES cipher system using the masking method according to some embodiments of the present invention applies the masking method to the sub-byte transformation block 330. In particular, a processing operation over a Galois Field $GF(2^8)$ of an S-BOX of the sub-byte transformation block 330 is transformed into an operation over a composite field $GF(((2^2)^2)^2)$. For some embodiments of the present invention, the operation over $GF(((2^2)^2)^2)$ is implemented using $GF((2^2)^2)$ and $GF(2^2)$.

An irreducible polynomial used in some embodiments of the present invention is defined as $$GF(2^8) = x^8 + x^4 + x^3 + x + 1 \quad (5)$$

$$GF(2^2) = x^2 + x + 1 \quad (6)$$

$$GF(2^2)^2 = x^2 + x + \phi \quad (7)$$

$$GF(((2^2)^2)^2) = x^2 + x + \lambda, \quad (8)$$

where $\phi = \{10\}_2 \in GF(2^2)$ and $\lambda = \{1100\}_2 \in (2^2)^2$.

Figure 5:
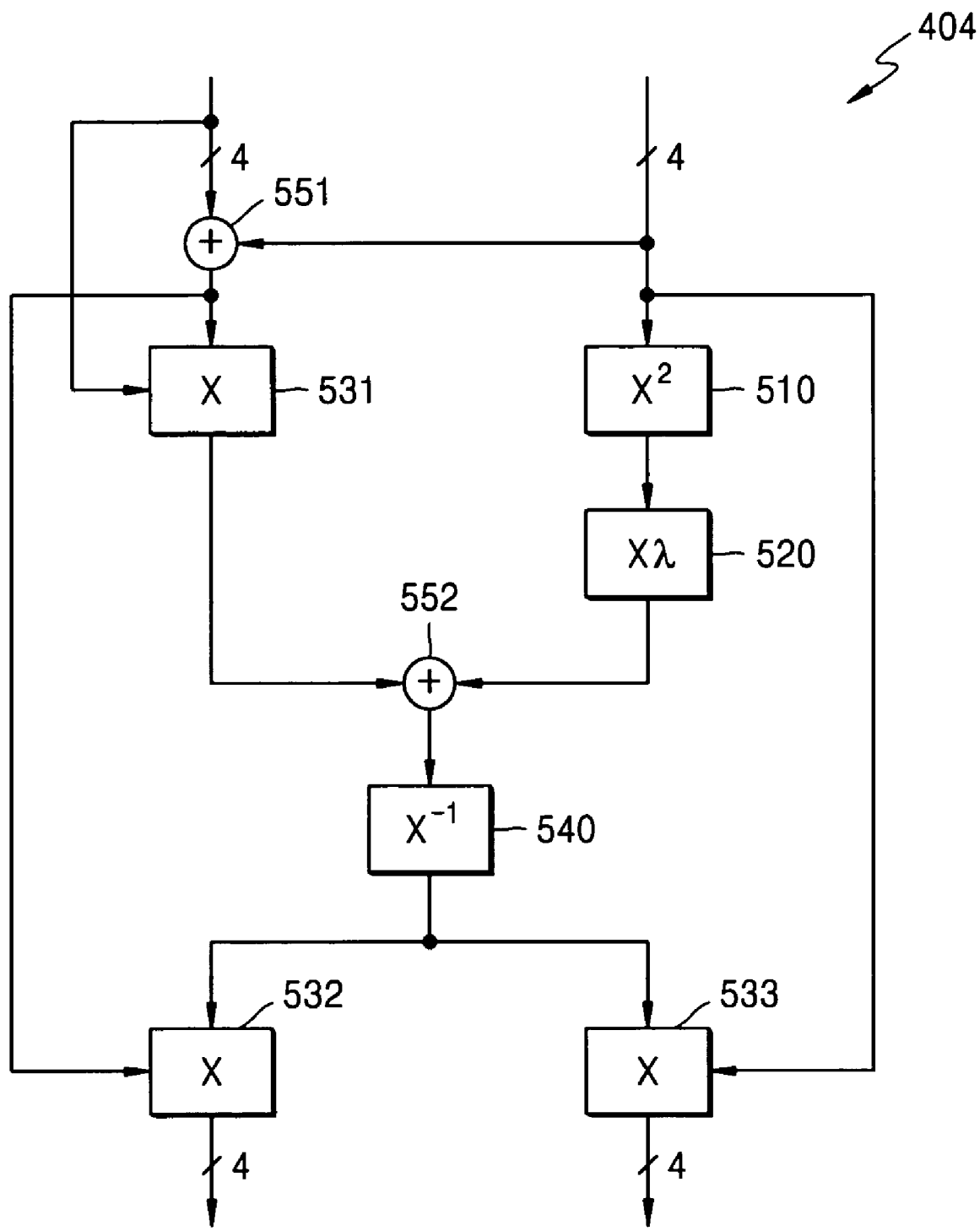
FIG. 5 is a block diagram illustrating the inverse transformation block of FIG. 4 for a $GF(((2^2)^2)^2)$ domain according to some embodiments of the present invention.

Some embodiments of the present invention will now be further described with reference to FIG. 5. FIG. 5 is a block diagram illustrating the inverse transformation block 404 of FIG. 4 for some embodiments of the present invention operating in a $GF(((2^2)^2)^2)$ domain. Referring to FIG. 5, the inverse transformation block 404 operating in the GF $(((2^2)^2)^2)$ domain includes a 4-bit squaring operation block 510, a 4-bit constant multiplication operation block 520, first through third 4-bit multiplication operation blocks 531 through 533, a 4-bit inversion block 540, and first and second exclusive OR (XOR) operation blocks 551 and 552.

The 4-bit squaring operation block 510 squares first 4-bit data. The 4-bit constant multiplication operation block 520 multiplies data output from the 4-bit squaring operation block 510. The first XOR operation block 551 XORs first (also input to 4-bit squaring operation block 510) and second 4-bit data inputs. The first 4-bit multiplication operation block 531 multiplies data output from the first XOR operation block 551 by the second 4-bit data input.

The second XOR operation block 552 XORs data output from the first multiplication operation block 531 and the 4-bit constant multiplication operation block 520. The 4-bit inversion block 540 inverts data output from the second XOR operation block 522. The second multiplication operation bock 532 multiplies the data output from the first XOR operation block 551 by data output from the 4-bit inversion block 540. The third multiplication operation block 533 multiplies the first 4-bit data input by the data output from the 4-bit inversion block 540.

As described above, the operations performed by the 4-bit squaring operation block 510 and the 4-bit constant multiplication operation block 520 are linear. As such, they may be implemented as hardware using the same operations both when the masking method is used and when the masking method is not used. However, as the operations performed by the three 4-bit multiplication operation blocks 531 through 533 and the 4-bit inversion block 540 are non-linear, they are not implemented as hardware using the same operations regardless of whether the masking method is used.

In this regard, in some embodiments of the present invention, to apply the masking method without additive special function blocks, a mathematical transformation is applied to the non-linear equations. The operations of the first through third 4-bit multiplication blocks 531 through 533 illustrated in FIG. 5 may be expressed as in Equations 9 and 10. For purposes of illustration, only one of the first through third 4-bit multiplication operation blocks 531 through 533 will be described as all of them may be identical.

$$(ax+b)(cx+d) \in GF(2^{2^2}) \quad (9)$$

$$\begin{aligned}(ax+b)(cx+d) &= acx^2 + (ad+bc)x + bd \\ &= ac(x+\phi) + (ad+bc)x + bd \\ &= (ac+ad+bc)x + (ac\phi+bd)\end{aligned} \quad (10)$$

In Equation 10, a 2-bit multiplication operation is performed four times, XOR three times, and x phi multiplication once. Equation 10 can be simplified to $$ac+ad+bc = (a+b)(c+d)+bd \quad (11)$$

Figure 6:
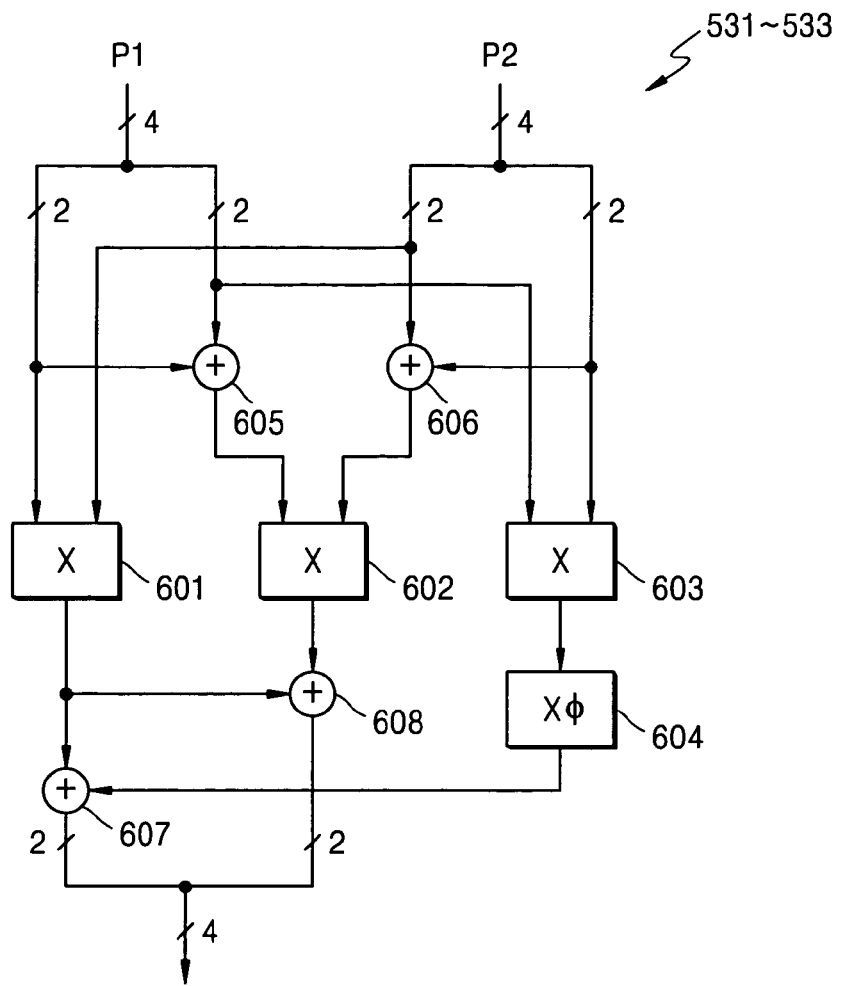
FIG. 6 is a block diagram illustrating the 4-bit multiplication operation block of FIG. 5 according to some embodiments of the present invention.

FIG. 6 is a block diagram of one of the first through third 4-bit multiplication operation blocks 531 through 533 illustrated in FIG. 5 according to some embodiments of the present invention. Referring to FIG. 6, each of the first through third 4-bit multiplication operation blocks 531 through 533 includes a fourth XOR operation block 605, a fifth XOR operation block 606, a first 2-bit multiplication operation block 601, a second 2-bit multiplication operation block 602, a third 2-bit multiplication operation block 603, a fourth 2-bit multiplication operation block 604, a sixth XOR operation block 607, and a seventh XOR operation block 608.

It is assumed for purposes of illustrating some embodiments of the present invention that two 4-bit data blocks are input to each of the first through third 4-bit multiplication operation blocks 531 through 533 as a first path data P1 and a second path data P2. The fourth XOR operation block 605 XORs upper 2-bit data and lower 2-bit data of the first path data P1. The fifth XOR operation block 606 XORs upper 2-bit data and lower 2-bit data of the second path data P2.

The first 2-bit multiplication operation block 601 multiplies the upper 2-bit data of the first path data P1 by the upper 2-bit data of the second path data P2. The second 2-bit multiplication operation block 602 multiplies data output from the fourth XOR operation block 605 by data output from the fifth XOR operation block 606. The third 2-bit multiplication operation block 603 multiplies lower 2-bit data of the first path data P1 by lower 2-bit data of the second path data P2. The fourth 2-bit multiplication operation block 604 multiplies data output from the third 2-bit multiplication operation block 603.

The sixth XOR operation block 607 XORs data output from the first 2-bit multiplication operation block 601 and data output from the fourth 2-bit multiplication operation block 604. The seventh XOR operation block 608 XORs the data output from the first 2-bit multiplication operation block 601 and data output from the second 2-bit multiplication operation block 602.

Referring to FIG. 6, if Equation 11 is used, the 2-bit multiplication operations (i.e., the first through third 2-bit multiplication operation bocks 601 through 603) should be performed three times, XORs (i.e., the fourth through seventh XOR operation blocks 605 through 608) four times, and the 2-bit constant multiplication operation (i.e., the 2-bit constant multiplication operation block 604) once.

Figure 7:
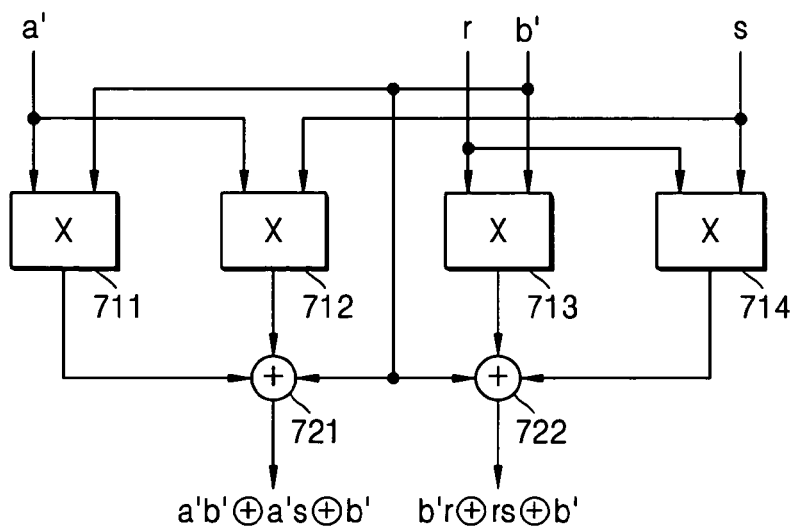
FIG. 7 is a block diagram illustrating the 2-bit multiplication operation block used in the 4-bit multiplication operation block of FIG. 6 according to some embodiments of the present invention.

FIG. 7 is a block diagram of a 2-bit multiplication operation block used in each of the first through third 4-bit multiplication operation blocks 531 through 533 illustrated in FIG. 6 according to some embodiments of the present invention. As shown in FIG. 7, a 2-bit multiplication operation block includes first through fourth 2-bit multiplication operation blocks 711 through 714, and first and second XOR operation blocks 721 and 722.

The first 2-bit multiplication operation block 711 multiplies two masked original data a' and b'. The second 2-bit multiplication operation block 712 multiplies the masked original data a' by random data s. The third 2-bit multiplication operation block 713 multiplies random data r by the masked original data b'. The fourth multiplication operation block 714 multiplies the random data r by the random data s.

The first XOR operation block 721 XORs data output from the first 2-bit multiplication operation block 711, data output from the second 2-bit multiplication operation block 712, and the masked original data b'. The second XOR operation block 722 XORs data output from the third 2-bit multiplication operation block 713, data output from the fourth 2-bit multiplication operation block 714, and the masked original data b'.

The relationship between a', r, b', and s is given by $$a' = a \oplus r \quad (12)$$

$$b' = b \oplus s \quad (13)$$

$$a, b, r, s \in GF(2^2) \quad (14)$$

where a and b indicate original data, and r and s indicate random data.

An operation performed by the 2-bit multiplication operation block illustrated in FIG. 7 is defined as $$(a', b'), (r, s) \xrightarrow{multiplication} (a'b' \oplus a's \oplus b', b'r \oplus rs \oplus b') \quad (15)$$

When the original data is a and b, an operation result of the 2-bit multiplication operation block without using the masking method is ab. If the random data r and s are added to the original data a and b, an operation result of the 2-bit multiplication operation block is a'b'⊕a's⊕b' and b'r⊕rs⊕b'. If a value obtained by XORing a'b'⊕a's⊕b' and b'r⊕rs⊕b' is ab, there is generally no problem in applying the masking method.

The process of XORing a'b'⊕a's⊕b' and b'r⊕rs⊕b' is shown in Equation 16 as follows:

$$\begin{aligned}(a'b' \oplus a's \oplus b') \oplus \\ (b'r \oplus rs \oplus b')\end{aligned} = a'b' \oplus a's \oplus b'r \oplus rs \quad (16)$$

$$= (a' \oplus r)(b' \oplus s)$$

$$= (a \oplus r)(b \oplus r) \oplus (a \oplus r)s \oplus (b \oplus s)r \oplus rs$$

$$= ab \oplus as \oplus br \oplus rs \oplus as \oplus rs \oplus br \oplus rs \oplus rs$$

$$= ab$$

Referring to Equation 16, it can be seen that original data ab is recovered by XORing a value output from the 2-bit multiplication operation block of FIG. 7. The first through fourth 2-bit multiplication operation blocks 711 through 714 used shown for the embodiments of FIG. 7 can be defined as:

$$=(ax+b)(cx+d) \in GF(2^2) \quad (17)$$

Figure 8:
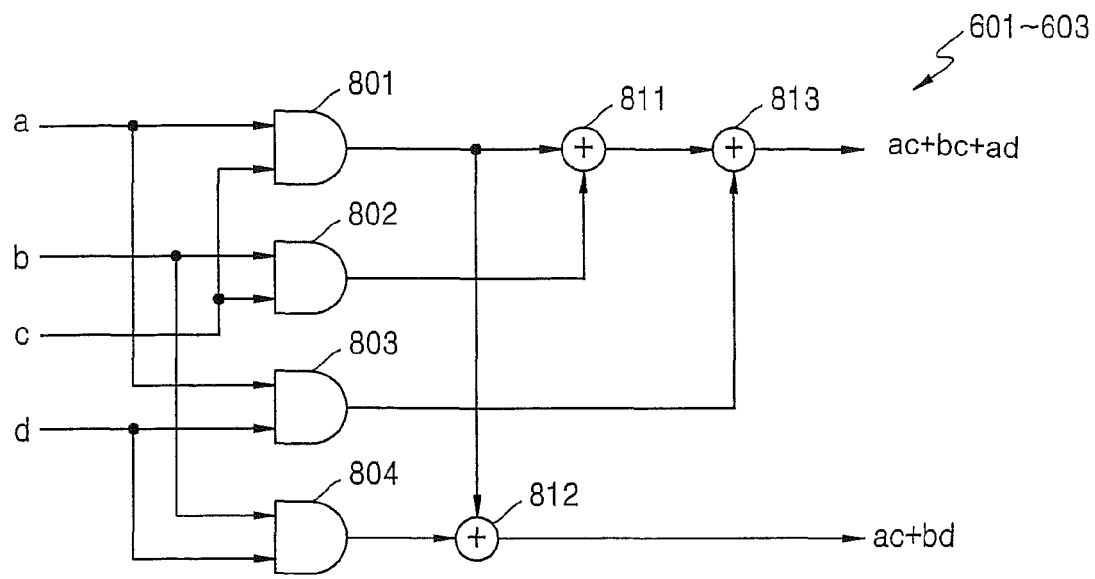
FIG. 8 is a block diagram illustrating a logic gate embodying Equation 17 according to some embodiments of the present invention.

FIG. 8 is a block diagram illustrating a logic circuit embodying Equation 17 according to some embodiments of the present invention. As shown in FIG. 8, the first through fourth 2-bit multiplication operation blocks 711 through 714 can be implemented using four AND gates 801 through 804 and three XOR gates 811 through 813. A first AND gate 801 logically ANDs two input data a and c and outputs the result. A second AND gate 802 logically ANDs two input data b and c and outputs the result. A third AND gate 803 logically ANDs two input data a and d and outputs the result. A fourth AND gate 804 logically ANDs two input data b and d and outputs the result.

A first XOR gate 811 XORs data output from the first AND gate 801 and the second AND gate 802. A second XOR gate 812 XORs the data output from the first AND gate 801 and data output from the fourth AND gate 804, and outputs the result (ac+bd). A third XOR gate 813 XORs the data output from the first XOR gate 811 and data output from the third AND gate 803, and outputs the result (ac+bc+ad).

Figure 9:
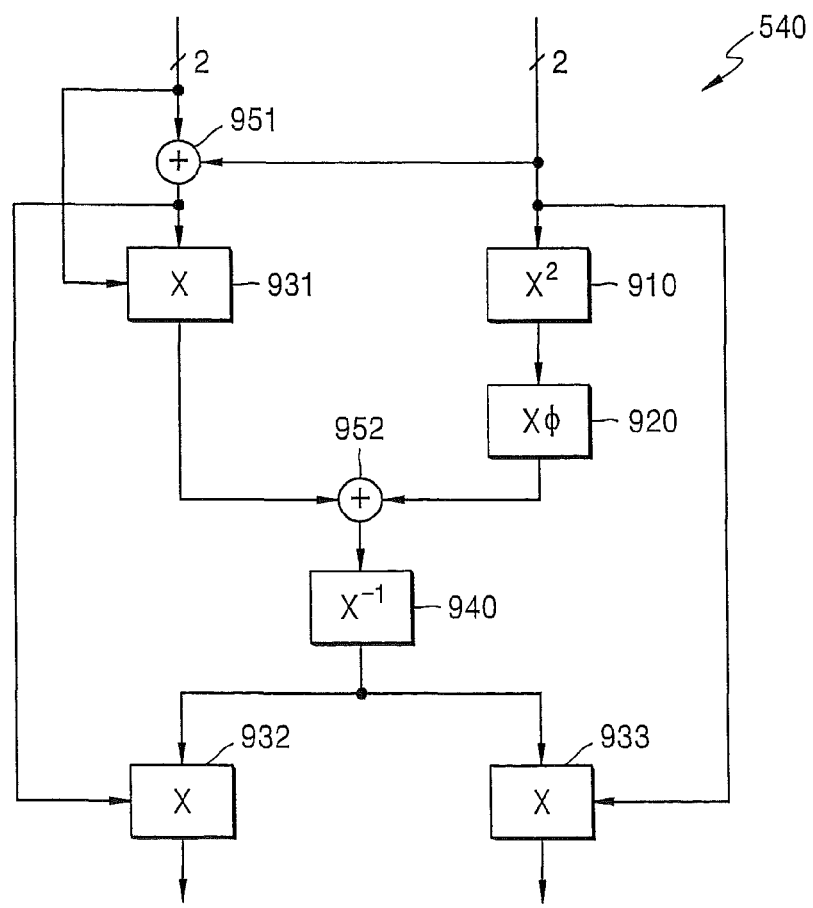
FIG. 9 is a block diagram illustrating the 4-bit inversion block of FIG. 5 according to some embodiments of the present invention.

FIG. 9 is a block diagram illustrating a 4-bit inversion block 540 of FIG. 5 according to some embodiments of the present invention. As shown in FIG. 5, the 4-bit inversion (GF((2²)²)) block 540 includes a 2-bit squaring operation block 910, a 2-bit constant multiplication operation block 920, fifth through seventh 2-bit multiplication operation blocks 931 through 933, a 2-bit inversion block 940, and third and fourth XOR blocks 951 and 952.

The 2-bit squaring operation block 910 squares upper 2-bit data of the 4-bit input data. The 2-bit constant multiplication operation block 920 multiplies data output from the 2-bit squaring operation block 910 by a constant. The third XOR operation block 951 XORs upper 2-bit data and lower 2-bit data. The fifth 2-bit multiplication operation block 931 multiplies data output from the third XOR operation block 951 by the lower 2-bit data.

The fourth XOR operation block 952 XORs data output from the 2-bit constant multiplication operation block 920 by data output from the fifth multiplication operation block 931. The 2-bit inversion block 940 performs an inverse operation on data output from the fourth XOR operation block 952. The sixth 2-bit multiplication operation block 932 multiplies data output from the 2-bit inversion block 940 by the data output from the third XOR operation block 951. The seventh 2-bit operation block 933 multiplies the data output from the 2-bit inversion block 940 by the upper 2-bit data.

The 4-bit inverse ($GF((2^2)^2)$) bock 940 illustrated in FIG. 9 and the 8-bit inversion ($GF(((2^2)^2)^2)$) block 540 illustrated in FIG. 5 are illustrated as composed of identical functional blocks, but data operated on by the functional blocks have been reduced from 4 bits to 2 bits, respectively. As an operation performed by the 2-bit inversion block 940 is the same as the 2-bit squaring operation, it may be possible to readily implement the 2-bit inverse operation 940 in hardware.

As described above, an AES cipher method and an AES cipher system using a masking method according to some embodiments of the present invention apply the masking method to both linear and non-linear functions present in an AES algorithm, which may be highly effective against power analysis attacks. Moreover, some embodiments of the present invention may reduce a total area required for implementing a system by applying the masking method to an S-BOX implemented over a composite field $GF(((2^2)^2)^2)$, which may reduce power consumption. In this regard, embodiments of the present invention may be applied, for example, to a smart card that may have strict limitations on memory capacity, computational capability, and power consumption.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A data cipher processor that uses a masking method in which original data and random data are processed according to a predetermined rule for encryption or decryption, the data cipher processor comprising:
  a 2-bit multiplication operation block,
  wherein, when the processor uses a masking method, the 2-bit multiplication operation block comprises:
    a first 2-bit multiplication operation block that multiplies two masked original data a' and b';
    a second 2-bit multiplication operation block that multiplies the masked original data a' by random data s;
    a third 2-bit multiplication operation block that multiplies random data r by the masked original data b';
    a fourth multiplication operation block that multiplies the random data r by the random data s; and
  wherein when the processor does not use the masking method, the 2-bit multiplication operation block comprises:
    a first AND gate that logically ANDs two original data a and c and outputs a result thereof as data;
    a second AND gate that logically ANDs two original data b and c and outputs a result thereof as data;
    a third AND gate that logically ANDs two original data a and d and outputs a result thereof as data;
    a fourth AND gate that logically ANDs two original data b and d and outputs a result thereof as data;
    a first XOR gate that XORs the data output from the first AND gate and the second AND gate and outputs the result thereof as data;
    a second XOR gate that XORs the data output from the first AND gate and the data output from the fourth AND gate and outputs a result (ac+bd) thereof as data; and
    a third XOR gate that XORs the data output from the first XOR gate and the data output from the third AND gate (803), and outputs a result (ac+bc+ad) thereof.

* * * * *